No. 624,209. Patented May 2, 1899.
J. A. HEANY.
WHEEL FOR VEHICLES.
(Application filed Mar. 5, 1898. Renewed Apr. 6, 1899.)
(No Model.)
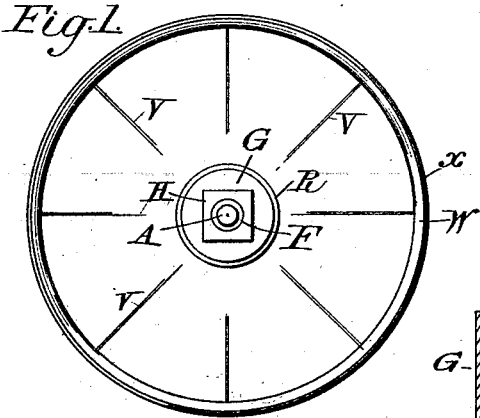
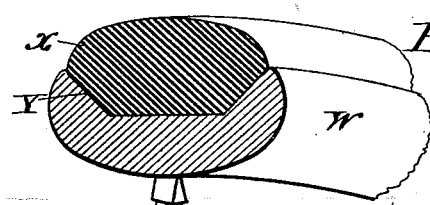
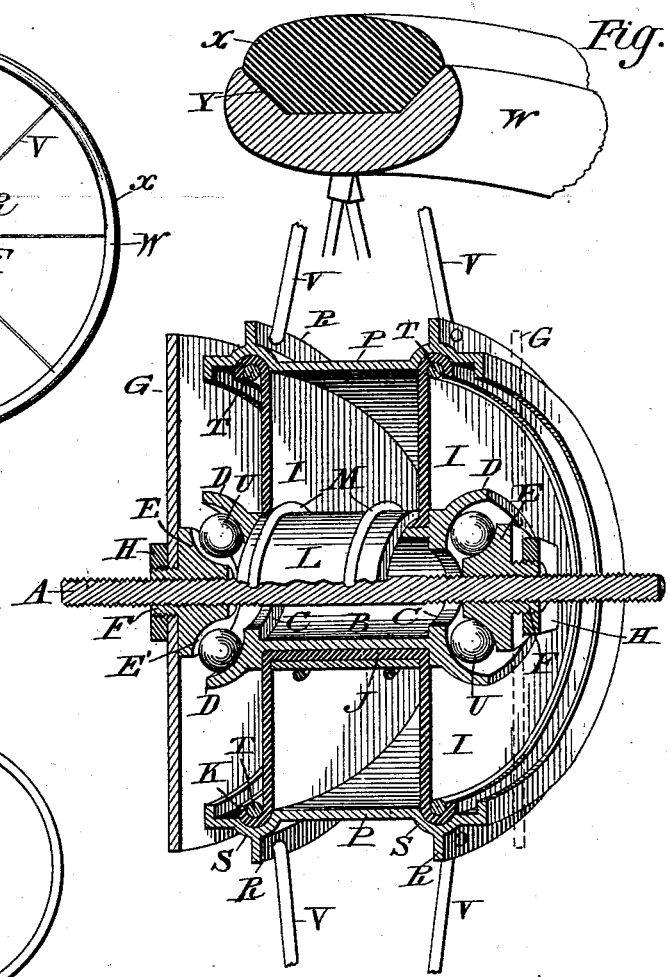
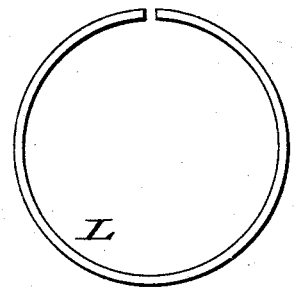
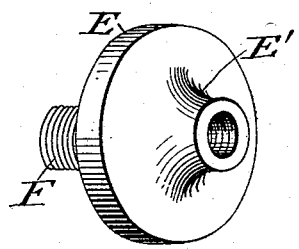
Witnesses:
Inventor:
John Allen Heany
THE NORRIS PETERS CO., PHOTO-LITHO., WASHINGTON, D. C.

UNITED STATES PATENT OFFICE.

JOHN ALLEN HEANY, OF PHILADELPHIA, PENNSYLVANIA.

WHEEL FOR VEHICLES.

SPECIFICATION forming part of Letters Patent No. 624,209, dated May 2, 1899.

Application filed March 5, 1898. Renewed April 6, 1899. Serial No. 711,946. (No model.)

*To all whom it may concern:*

Be it known that I, JOHN ALLEN HEANY, a citizen of the United States, and a resident of Philadelphia, Pennsylvania, have made certain Improvements in Wheels for Vehicles, of which the following is a description, reference being had to the annexed drawings, making part hereof.

My invention relates to that class of wheels wherein more or less resiliency is sought to be attained between the tread of the wheel and the hub which sustains the weight of the carried part of the vehicle and the load sustained. Heretofore all efforts to attain this end seem to have been directed toward locating the agent imparting this resiliency beyond the outer ends of the spokes and in the vicinity of the felly. I, however, locate this agent or agency within the inner or converging ends of the spokes and about the hub of the wheel. The true nature of my invention will, however, appear from the following specification and claim.

In the drawings, Figure 1 is a side elevation of a wheel provided with my device; Fig. 2, a view partly perspective, partly in transverse diametrical section, and partly broken; Fig. 3, a side elevation of the metallic band-clasp which binds the rubber to the hub; Fig. 4, a broken perspective of one of my metallic binding-wires provided with right and left screw-threads and corresponding nut; Fig. 5, a detached perspective view of the long nut.

A is the axle; B, a horizontal annular cylinder provided with downwardly-projecting end flanges C C and upwardly and outwardly curved or cup-shaped flanges D D.

E E are long nuts screwed over the ends of axle A, their inner parts being concave, as at E' E', and the outer part of each provided with a screw-threaded neck F.

U U are metallic balls held between the concavities E' E' of nuts E E and those of cup-shaped flanges D D, thus constituting two ball-bearings for hub B C D.

G G are large sheet-metal guards setting by their pierced centers over necks F F of nuts E E. These guards are designed to prevent lateral deflection of the parts and are held in place by the ordinary screw-nuts H H. One of the guards G, to the right in Fig. 2, is indicated by dotted lines.

I I are two suspension-diaphragms of rubber. They are connected by the cylindrical part J, which envelops the annular cylinder B, and are each provided around their edges by the outwardly-projecting flanges K K.

L is a split metallic band-clasp cylindrical in form when in place over cylindrical rubber part J. (See Figs. 2 and 3.)

M M are two metallic strips or wires passed around clasp L and provided with right and left screw-threaded ends N N and correspondingly-screw-threaded nuts O, whereby the ends N N may be drawn together to tighten clasp L, and thus compress the cylindrical rubber part J against metallic cylinder B.

It may be remarked here that cylinder B, with its flanges C and D, constitutes practically the hub of the wheel.

P is the spoke-ring, to which the inner ends of the spokes are secured, and it is provided for this purpose with two outer annular fins R R and annular grooves S S, which in this instance are corrugations concave from within.

T T are expansion strips or wires constructed similarly to wire M. (Shown in Fig. 4.) Flanges K K of diaphragms I I set in over the grooves S S and are forced into them and held firmly in place by these wires T T, which are expanded each by a nut O, Fig. 4, being turned so as to force apart the wire ends it engages over.

V V are spokes, W the felly, and X an ordinary rubber-ring tire sprung into a groove Y in the outer surface of the felly.

I constitutes a webwork of rubber connecting the ring P with the hub, and this ring and the hub are concentric, though separated and united by the rubber web, as shown. This rubber web, as is evident, constitutes a springing or elastic and flexible connection between the spoke-ring and the hub.

What I claim as new is—

In a wheel for vehicles, the combination of a hub and a spoke-ring, concentric therewith, and with a space between them; said hub and ring being connected by a rubber webwork consisting of diaphragms I I, cylindrical part B and flanges K K; clasp-band L; binding-wires M M and T T; spokes V and felly W, substantially as described.

JOHN ALLEN HEANY.

Witnesses:
WM. R. HELLYER,
ANDREW BROGAN.